Dec. 10, 1963 P. W. SMITH, JR., ETAL 3,113,456
LIQUID VOLUME SENSING SYSTEM
Original Filed June 15, 1956 2 Sheets-Sheet 2
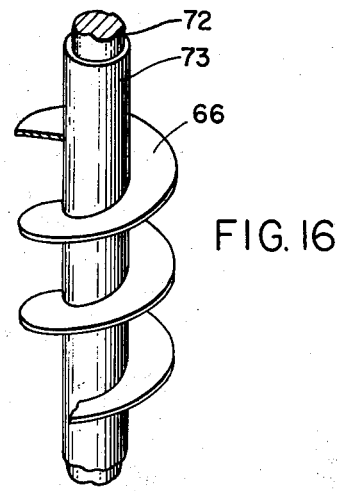
FIG. 16
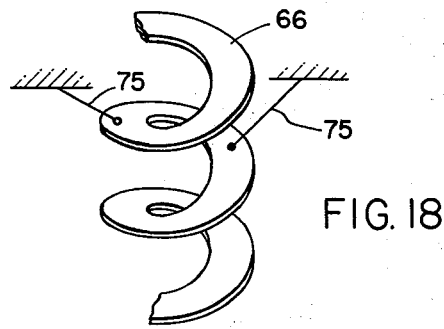
FIG. 18
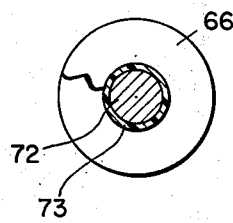
FIG. 17
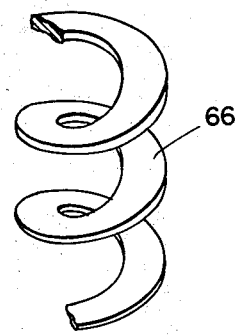
FIG. 19
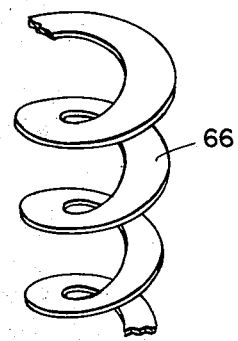
FIG. 20
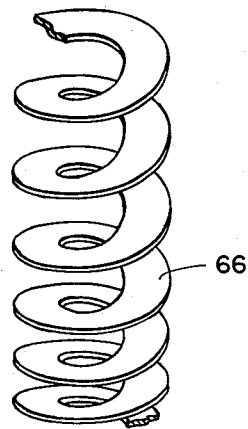
FIG. 21
INVENTORS
PRESTON W. SMITH, JR.
MIGUEL C. JUNGER
BY
ATTORNEY United States Patent Office 3,113,456
Patented Dec. 10, 1963

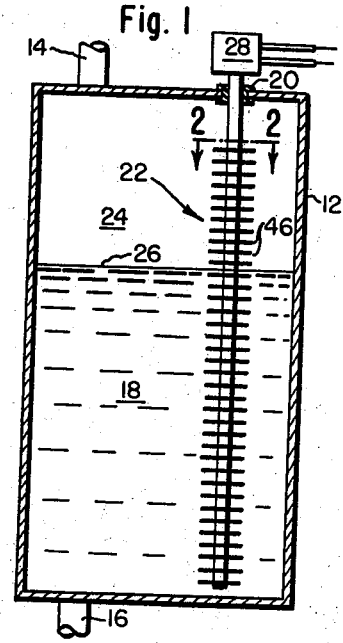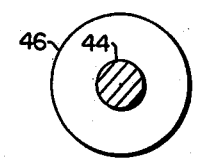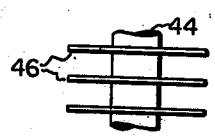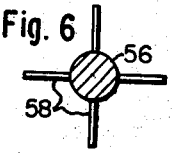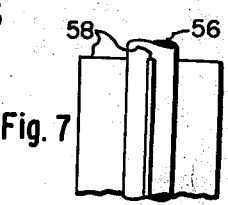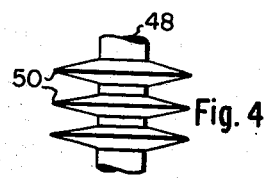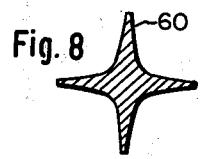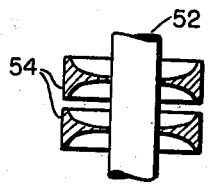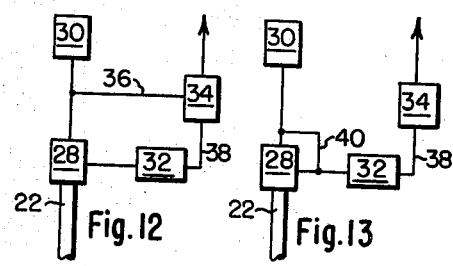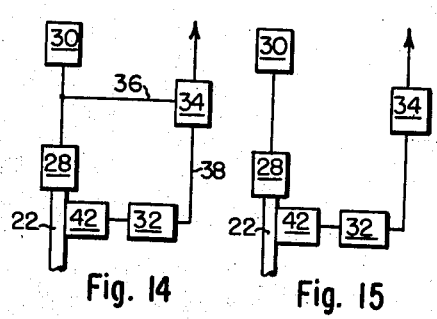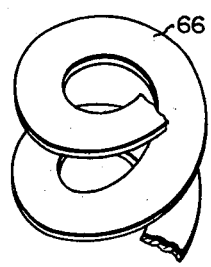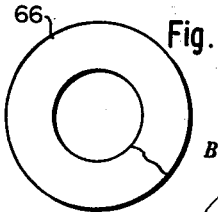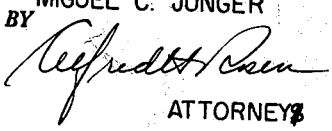

3,113,456
LIQUID VOLUME SENSING SYSTEM
Preston W. Smith, Jr., and Miguel C. Junger, Cambridge, Mass., assignors to Acoustica Associates, Inc., Fairview, Long Island, N.Y., a corporation of New York
Original application June 15, 1956, Ser. No. 591,622, now Patent No. 2,998,723, dated Sept. 5, 1961. Divided and this application June 3, 1960, Ser. No. 33,753
18 Claims. (Cl. 73—290)

The present invention relates generally to sonic wave apparatus for measuring the displacement of the surface level of a liquid from a reference level, in a container having variable horizontal sectional area defined by its walls, or for similar purposes. More particularly, the invention is concerned with improvements in sonic wave conductors suitable for use in these types of apparatus. This is a division of our copending application Serial No. 591,622, filed June 15, 1956, now Patent No. 2,998,723, granted September 5, 1961.

Hitherto, devices have been proposed for measuring the level of a liquid by immersing an elongated elastic conductor element in the liquid so that it breaks the surface thereof, and oscillating either the upper or immersed end to propagate stress waves axially along the conductor. As each wave reaches the boundary surface between the contiguous fluid media, an echo is generated which travels in the reverse direction. The source of the oscillations or pulses is constituted by an electromechanical transducer such as piezoelectric crystal or an electrostatically or electromagnetically vibrated element. Somewhat similar apparatus has been proposed for use as a so-called "end-fire directional source" of sound energy in sound ranging apparatus, in which case the energy is sent out into a surrounding liquid from the end of the wave conductor by the additive effect of axially symmetrical waves travelling along its surface.

There are three principal modes of oscillation that may be imparted to the elongated conductor by the transducer. These depend on the mode of attachment of the transducer and the driving frequency. In a practical application there is often a combination of more than one mode of oscillation. In purely "axial" oscillation, the particle motion is substantially entirely parallel with the principal or axial dimension. In "torsional" oscillation, the wave is propagated by rotational oscillation of each transverse cross section about the principal dimension or axis of the conductor. In "bending" oscillation, the conductor bends transversely away from its position at rest and each cross section is rotated somewhat about a line transverse to the longitudinal dimension. In each type of oscillation, taking a simple cylindrical rod for example, displacements of the surface of the conductor are produced either by variations in the area of each section or lateral translations thereof, and hence there is sonic coupling to the surrounding fluid medium.

Where the conductor extends through a boundary surface between differing fluid media, an echo is transmitted back towards the exciting transducer, and the sum of the distances travelled by each wave or pulse generated at the transducer and its reflected echo is found by the expression $L=ct$, where "$c$" equals the predetermined velocity of sound in the given medium and "$t$" is the total elapsed time of travel of the two waves.

Prior use of this type of apparatus has been limited by certain physical considerations. In a liquid level measuring device, the problem is to generate a sufficiently strong echo to permit positive detection so as to measure the factor "$t$" with accuracy. The strength of the echo is determined by the difference in acoustic coupling between the conductor and the first surrounding fluid medium, as compared with that between the conductor and the second surrounding medium. When the conductor is of the form of a hollow cylindrical tube or rod, as hitherto proposed, the acoustic coupling with either fluid is greatly limited, with the result that an echo of limited intensity is produced. To enhance the amplitude of this echo, one might utilize a cylinder of relatively great elasticity whereby its surface movements will be relatively large and the coupling improved accordingly. The driving frequency and the mode of oscillation may also be varied for this purpose. Increased elasticity of the propagator also results in decreased phase velocity of the waves and a longer measured factor "$t$." This is desirable from the standpoint of decreasing the error introduced by the time measurement. However, the methods hitherto proposed are largely limited by the available selection of materials.

In the case of end-fire sources, the problem is to achieve a maximum of energy transmission in the selected direction. For practical purposes, the solution has been found by attempting to reconcile two conflicting requirements, first, for sufficient elasticity to provide substantial sonic coupling with the surrounding medium, and second, for sufficient stiffness or rigidity to provide a velocity of sound propagation in the conductor substantially equal to that afforded by the surrounding fluid. This latter requirement arises from observing the requirements for maximum directional selectivity in the axial direction with respect to the conductor.

A principal object of this invention is to provide novel means for achieving improved sonic coupling between a wave conductor and the surrounding fluid, whereby an improved liquid level measuring or sound ranging device is obtained.

With the above and other objects in view, the features of the invention include the provision of improved wave conductor structures having larger surfaces of contact with the fluid which vibrate in directions having normal components, whereby greatly improved sonic coupling is achieved.

Another feature resides in the provision of conductor structures having geometrical configurations adapted to the particular type of wave propagation employed.

Still another feature resides in the provision of conductor structures which are adaptable to permit variations in the velocity of wave propagation along the principal axis, such variations being produced either uniformly along the said axis, or variably along the axis according to a predetermined function such as the shape of a fluid container. By these means, we are enabled to provide a device to measure the volume of fluid in a container having variable horizontal cross-sectional areas within its walls.

An additional feature resides in the provision of novel conductor structures for sonic wave transmission in devices for measurement of the displacement of the level of a fluid surface with reference to a predetermined level, in devices for sound ranging, and in similar devices.

Other features of the invention reside in certain details of construction and modes of operation that will be best appreciated from a study of the following description of various preferred embodiments adapted to describe applications and modes of operation, having reference to the appended drawing illustrating the same.

In the drawing, FIG. 1 is a side elevation in section, somewhat schematic in form, illustrating the arrangement of a sonic wave conductor in relation to a fluid container;

FIG. 2 is a plan elevation in section of the conductor element taken on line 2—2 in FIG. 1;

FIG. 3 is a partial side elevation corresponding to FIG. 2;

FIG. 4 is a partial side elevation illustrating a variant of the device shown in FIGS. 2 and 3;

FIG. 5 is a partial side elevation illustrating another variant of the conductor;

FIG. 6 is a plan elevation in section similar to FIG. 2 and showing a variant of the conductor best adapted to a different type of oscillation;

FIG. 7 is a partial side elevation corresponding to FIG. 6;

FIG. 8 is a plan elevation in section illustrating a variant of the conductor shown in FIGS. 6 and 7;

FIG. 9 is a partial side elevation showing another form of wave conductor;

FIG. 10 is an oblique view, partially broken away, of still another variant of the wave conductor;

FIG. 11 is a plan view of the form illustrated in FIG. 10;

FIGS. 12–15 are block diagrams illustrating various circuit connections to be employed for wave propagation in liquid level measuring devices;

FIGS. 16 and 17 illustrate a variation of the conductor based on FIGS. 10 and 11 having a central supporting core;

FIG. 18 illustrates a variation of the conductor based on FIGS. 10 and 11 having supporting wires; and FIGS. 19–21 illustrate variations of the conductor based on FIGS. 10 and 11 for direct volume measurements in certain containers.

Referring to FIG. 1, there is illustrated a cylindrical tank 12 having an inlet pipe 14 and an outlet pipe 16. A variable quantity of fluid 18 is contained in the tank, and the object is to provide an external indication of the level of the fluid as a measure of its volume. To this end, there is provided a suitable bushing 20 in which is supported an elongated sonic wave conductor element 22. The conductor is supported so that it extends down into the fluid, whereby the lower portion is immersed in the fluid 18 and the upper portion is immersed in a second fluid in the space 24, which is commonly but not necessarily air. The boundary surface 26 between the two fluids determines the longitudinal position on the conductor element 22 from which echoes are reflected to the end from which the waves are propagated.

A suitable electromechanical transducer 28 is attached to the upper end of the conductor element 22. Alternatively, the transducer may be attached to the bottom end. The transducer generates waves or pulses which are transmitted along the conductor element and reflected back towards the source as echoes from the surface 26. Transducer means, which may be constituted by the same or a similar source, receive the echo, which is compared with the pulse originally transmitted to find a measure of the distance travelled.

Circuit means of any conventional form may be employed with the improved conductor element. Various suitable forms are illustrated by block diagrams in FIGS. 12 to 15. Referring first to FIG. 12, an electrical wave generator 30 sends waves or pulses directly to the transducer 28. The transducer converts the electrical pulses to mechanical vibrations which are transmitted as waves along the conductor 22. The echo pulses reflected back to the transducer 28 are converted to electrical energy which passes through an amplifier 32 to a time comparator circuit 34. The comparator circuit also receives pulses directly from the generator 30, and measures the time lapse between each pulse received over a circuit 36 and the corresponding reflected echo pulse received over a circuit 38. As previously stated, the total distance travelled by the original pulse along the conductor and by the returning echo equals the product of this time lapse and the predetermined velocity of sound in the conductor. This latter velocity is ordinarily and preferably measured directly by suspending the conductor free of the surface, and measuring its length and the time lapse between a pulse of the selected frequency and its reflected end echo as is well understood in the art.

The variation of FIG. 13 differs from that previously described in that the circuit 36 is replaced by a circuit 40, whereby the direct waves or pulses from the generator 30 are passed through the receiving amplifier 32; hence, both the original pulses and the echoes are amplified and transmitted to the time comparator 34 through the circuit 38.

In the variant of FIG. 14 a second transducer 42 is employed. The primary pulses are transmitted as in the cases of FIG. 12 and 13, but the echoes are received by the amplifier 32 through the transducer 42. The circuits 36 and 38 are connected with the comparator 34 as in the case of FIG. 12.

The variation of FIG. 15 is also employing the transducer 42, but in this case the transducer is adapted to receive both the original pulse moving downwardly and the echo moving upwardly. Both pulses are amplified in the amplifier 32 and sent to the time comparator 34.

Central to the present invention is a recognition of the nature of the conditions which give rise to strong, accurately measurable echo pulses. As previously stated, these pulses depend for their strength upon the difference in sonic coupling between the conductor and the two fluids in which it is immersed. Thus, if there is negligible coupling with both fluids, the echo will be negligible. On the other hand, if the coupling with the fluid 18 is very strong and that with the fluid in the space 24 comparatively weak, a strong echo will be achieved. We have found that the provision of conductor structures adapted to enhance the coupling, while necessarily increasing the coupling with both fluids simultaneously, affords a net improvement in that the difference in reactions of the two fluids on the wave in the conductor is increased so as to give rise to a stronger echo. Thus, greater advantage is taken of any differences in the influence which the two contiguous fluid media may have on the transmission. To this end we have devised a variety of configurations, from which the preferred configuration is selected upon the basis of the type of oscillation imparted by the transducer 28, and other considerations including the characteristics of the fluids as will be apparent to one skilled in the art.

A first configuration is illustrated in FIGS. 2 and 3. This comprises a metallic rod 44 of cylindrical form constituting a core and a series of spaced laterally oriented fins 46 surrounding the core and extending outwardly therefrom in mutually parallel planes at right angles to the axis of the core. While the fins 46 are relatively thin and may accordingly have some flexibility, their stiffness is appreciable, whereby axial oscillation of the core 44 imparts motion to the fins in the direction normal to their surfaces. This greatly enhances the sonic coupling between the conductor and the surrounding fluid media.

While the conductor of FIGS. 2 and 3 is well suited to the axial type of oscillation as previously described, it is also effective for bending oscillation; but it is relatively ineffective for substantially pure torsional oscillation, wherein the fins would tend to oscillate by rotation in the planes of their respective surfaces.

The variant of FIG. 4 includes a central core or rod 48 along which are disposed a series of spaced fins 50. In this case the fins are made comparatively rigid by reason of their greater thickness adjacent the core 48. In general, sonic coupling is enhanced as the rigidity of the fins is increased.

Another way to increase sonic coupling is illustrated in FIG. 5. Here, a central cylindrical core 52 is surrounded by a plurality of rimmed spaced lateral fins 54 which tend to enclose the immediately surrounding fluid medium.

The variants of FIGS. 2 to 5 are described above as having solid cylindrical central cores. Alternatively, these cores may be constructed of hollow cylindrical tubes which may contain a fluid or solid fill depending upon the desired phase velocity. Also, the core may have a cross-section other than circular, if desired. In any of these cases, the fins are secured by relatively rigid connections with the wall of the core, and the transducer is coupled to the core, whereby vibrations in the wall of the core are carried to the fins, and from the fins into the surrounding fluid medium.

In order to improve the operation of the devices of FIGS. 2 to 5, it is desirable to reduce the effects of reflections from the individual fins as the wave progresses, so as to emphasize the echo from the fluid surface. To this end, it is preferable to provide a plurality of fins in each wavelength of distance along the conductor, in fact, as many fins as is practicable.

For the torsional type of input oscillation the variant of FIGS. 6 and 7 may be employed. Again, a hollow or solid central cylindrical core 56 is provided, and a plurality of longitudinally oriented fins 58 are secured to its periphery. It will be observed that torsional as well as bending oscillation imparts displacements to the fins with components normal to their surfaces, whereby sonic coupling to the surrounding fluid media is greatly enhanced.

In the embodiments of any of FIGS. 2 to 8 the fins may be integral with the central core or rigidly secured thereto. Thus, in FIG. 8, the conductor 60 is an elongated member having a star-shaped cross section with smooth curves joining the peripheral fin portions with the central core portion. Also, the shapes of the fins in the embodiments of any of FIGS. 2 to 8 may be other than circular or rectangular since the area effectively coupled with the fluid medium is the important criterion. In the embodiments of FIGS. 2 to 5, the spacing of the laterally oriented fins may be varied in accordance with the amount of coupling desired; and the same considerations apply to the angular spacing of longitudinally oriented fins as in the case of FIGS. 6 to 8.

From the basic shapes of fins previously described, one may devise a large number of combinations of shapes giving rise to more or less complicated structures. Thus, in cases where the transducer 28 imparts some combination of the basic types of oscillation, it may be desired to have fins such as those of FIGS. 2 and 3 combined with short intermediate fins similar to those of FIGS. 6 and 7, either between the former fins or constituted by longitudinally oriented extensions or projections therefrom.

One form of fin that may be characterized as a combination of the fins previously described is illustrated in FIG. 9. There is provided a cylindrical hollow or solid central core 62 about which is rigidly secured and supported a helicoidal-shaped fin 64 of thin sheet material having sufficient stiffness to partake of oscillations in the core. The fin provides coupling to the surrounding fluid for any of the modes of oscillation imparted by the transducer 28, or any combination thereof. As in the cases previously discussed, the propagation of sound waves is carried out by oscillations in the body of the core 62, which are imparted to the attached fin through a relatively rigid connection.

Another form of conductor is illustrated in FIGS. 10 and 11, and comprises a helicoidal-shaped ribbon-like element 66 similar to the fin 64 in FIG. 9, but without an attached central core. In the preferred application of this embodiment, the transducer 28 imparts oscillations to one end of the element 66 approximately normal to the surface of the element. The sound waves travel in a manner similar to the bending oscillations previously described about a helical path along the length of the element and to an approximation the "peripheral phase velocity" may be expressed as a constant. The value of this constant is a function of the density and elasticity in bending of the ribbon, the elasticity in turn being affected by the elastic modulus of the particular material employed and the width, thickness and average radius of the individual turns as measured from the principal axis. Thus, for a ribbon of given cross-section, flexibility is increased and peripheral phase velocity decreased by reduction in the thickness of the ribbon.

Additional advantages of the embodiment of FIGS. 10 and 11 results from the fact that the "longitudinal velocity," that is, the rate of travel of the waves in the principal or axial direction, is a function of both the "peripheral phase velocity" and the peripheral distance around the turns per unit of axial or longitudinal distance. This is in turn a function of the average radius of the turns and the pitch. Thus, variations in longitudinal velocity can be introduced by changing the pitch of the turns or the average radius as well as by changing any of the above factors determinative of the peripheral velocity. In fact, for purposes of adjustment or compensation it is ordinarily more practical to change the pitch, while leaving the peripheral velocity substantially unchanged. This introduces many possibilities which greatly enhance the usefulness of a fluid level indicator. One example relates to the problems of temperature compensation. Hitherto, the readings of sonic-type liquid level indicators have been subject to variations in the temperature of the surrounding fluid. These arise from the temperature coefficients of the conductor, the liquid and the tank 12. Thus, an increase in temperature may cause an apparent change in the liquid level as interpreted at the output. For many purposes a more useful reading would furnish a measure of the level which the liquid would reach at a predetermined reference temperature, or the mass of volume of the liquid as distinguished from the height of its surface. Such a reading is made possible with a conductor of the type shown in FIGS. 10 and 11. To this end, the conductor is suspended under tension resiliently from its ends. By reason of the longitudinal flexibility, the pitch of the turns can be varied as a function of the applied tension. Variable external tension applying means, not illustrated, can be used to vary the tension, and hence the pitch, upon a corresponding change in the temperature. Thus, the longitudinal velocity of wave propagation is varied to compensate for any change in the peripheral distance that the waves must travel due to the change in temperature.

Another use which may be made of this dependence of longitudinal velocity on the pitch is to provide a direct indication of fluid volume in a container having a variable horizontal cross section. In this case we provide a helicoid 66 having turns with variable pitch along the longitudinal axis. Thus the peripheral distance around the helicoid from transducer 28 to any given level is proportionally related either to the volume of fluid that would be contained if the surface were at that level, or to the volume of the space above that level, depending upon whether the transducer 28 is connected to the upper or lower end of the conductor.

Direct volume measurements for containers having variable horizontal cross-sectional areas may also be achieved with helicoidal conductors of uniform pitch throughout their length, by varying the peripheral phase velocity through any one or a combination of the factors previously discussed. Thus, as shown in FIG. 19, the thickness of the ribbon can be varied as a function of longitudinal position. For a ribbon of constant thickness, the average radius may be varied, as shown in FIG. 20, by providing an inner edge of constant radius while varying the radius to the outer edge as a function of longitudinal position. For a ribbon of unvarying cross section, the curvature of the turns may be varied as a function of longitudinal position with a like effect, as shown in FIG. 21.

Variations of the conductor based upon the embodiment of FIGS. 10 and 11 may be constructed with various forms of static support having relatively little or reduced influence upon the propagation of sonic waves while at the same time stabilizing the static orientation of the propagator element. One arrangement to this effect, as shown in FIGS. 16 and 17, includes a central supporting core 72 similar in general appearance to that of FIG. 9 but in this case coupled to the inner periphery of the helicoid 66 through a suitable so-called "pressure-release" substance 73 such as a bubble-filled rubber or plastic substance. In any case, sonic energy transmission through such substances is at a minimum or greatly reduced, and the longitudinal velocity remains a function of the pitch as in the case of the embodiments of FIGS. 10 and 11, rather than relatively independent thereof as in the case of FIG. 9. Also, it will be apparent that the mechanism of wave propagation in this case does not require the imparting of appreciable particle motion to the body of the core itself. Another form of static support, shown in FIG. 18, consists in the use of supporting wires 75 or the like attached to the helicoid 66 with a minimum of contact area therewith.

For very thin helicoidal fins of the form illustrated in FIG. 9, it is possible to achieve a wave propagation somewhat similar to that of FIGS. 10 and 11, although in this case the restraint offered by the central core 62 at the inner periphery of the fin becomes an important factor affecting the peripheral phase velocity. The mode of attachment of the end source is like that for FIGS. 10 and 11, whereby a minimum of motion is imparted to the core.

In the foregoing discussion, we have considered various embodiments of wave conductors as applied to liquid level measuring devices. These illustrations are given only by way of example, since in fact the improved conductors have even wider utility. As previously indicated, end-fire directive sources for sound ranging of the forms hitherto proposed have been unsatisfactory because of the difficulty of satisfying the conditions necessary for directional selectivity while achieving a beam of practicable intensity. The former requirement imposes a condition that the phase velocity along the conductor be of the same order of magnitude as the velocity in the liquid itself, whereby the axially symmetrical waves moving along the surface of the conductor are in proper phase with the beam emitted into the liquid. The latter requirement is one of providing sufficient sonic coupling between the conductor and the liquid so that the beam will be sufficiently intense. With wave conductors of the configurations hitherto proposed, for example cylindrical tubes or rods, the difficulty which arises is that the material of the rod must be stiff enough to afford a phase velocity similar to that in water, and hence the coupling and beam intensity are necessarily limited.

By use of any of the improved forms of conductors described herein, and especially those of FIGS. 2 to 5, it is possible to improve the intensity of the beam without sacrifice in directional selectivity. It will be noted that the addition of fins to the central core radically increases the coupling to the surrounding liquid for any combination of the other factors affecting the axial velocity which have been previously considered, such as frequency, material characteristics and dimensions.

From the foregoing discussion, it will be appreciated that the multiplicity of forms of sonic wave conductors described above is only suggestive of a considerably greater number of possible variations in accordance with the principles herein described. In any case, the preferred form is determined by a consideration of the particular application and the character of the transmitted wave propagation, as hereinabove described. Therefore, while we have described certain specific embodiments as illustrative of the invention, such other forms as would occur to one skilled in this art on a reading of the foregoing specification are also within the spirit and scope of the invention, and it is intended that this invention include all modifications and equivalents which fall within the scope of the appended claims.

What is claimed is:

1. In combination, a sonic wave conductor for determining the volume of a fluid in a container having variable horizontal sectional areas defined by its walls, said conductor having fin-like means for coupling elastic wave energy between said conductor and a surrounding fluid medium, said fin-like means extending radially from an elongated central axis, support means disposing said conductor in said container with said axis normal to and normally breaking the surface of said fluid, said fin-like means varying in dimension in accordance with the variations in the sectional areas defined by said walls whereby the longitudinal velocity of waves in said conductor along said axis is varied in accordance with such variations in the sectional areas, and means to vibrate an end of said conductor periodically in a direction to cause periodic displacement of said fin-like means having substantial components normal to its surface.

2. Combination according to claim 1 in which said fin-like means comprises a plurality of radially extending portions arrayed along said axis.

3. Combination according to claim 1 in which said fin-like means consists essentially of a substantially helicoidal-shaped element adapted to be suspended resiliently under tension applied parallel to said axis.

4. Combination according to claim 1 in which said conductor comprises a flexible, substantially helicoidal-shaped element adapted to be adjustably contracted or extended in the direction of said axis to vary the pitch of its turns.

5. Combination according to claim 1 in which the cross sections of said fin-like means transverse to said axis have edges varying in distance from said axis in accordance with the variations in said sectional areas.

6. Combination according to claim 1 in which said fin-like means comprises a plurality of radially extending portions arrayed along said axis at varying distances in accordance with the variations in said sectional area.

7. Combination according to claim 1 in which said conductor includes a generally helicoidal-shaped element with turns varying in pitch along said axis in accordance with the variations in said sectional area.

8. Combination according to claim 1 in which said fin-like means vary in cross-sectional area, in planes normal to said axis and distributed along said axis, in accordance with the variations in said sectional area.

9. Combination according to claim 1 in which said conductor includes a generally helicoidal-shaped element with turns varying in cross-sectional area along said axis in accordance with the variations in said sectional area.

10. Combination according to claim 1 in which said fin-like means vary in thickness as a function of longitudinal position along said axis.

11. Combination according to claim 1 in which said support means includes an elongated support member disposed along said axis, said fin-like means being attached to and supported by said support member.

12. Combination according to claim 11 in which said conductor comprises a substantially helicoidal-shaped element enclosing and radially extending from said support member.

13. Combination according to claim 11 in which said fin-like means vary in thickness as a function of longitudinal position along said axis.

14. Combination according to claim 11 in which said support member is of constant cross-sectional diameter and the cross sections of said fin-like means transverse to said axis have edges varying in distance from said support member in accordance with the variations in said horizontal sectional area of said container.

15. Fluid level measuring apparatus having, in combination, a sonic conductor having an elongated core with its longitudinal dimension having a substantial component normal to and normally breaking the fluid surface to be measured, and a plurality of fin-like projections secured to the core in spaced relation and having surfaces with appreciable areas of projection on a plane at right angles to said dimension, a dimension of said fin-like projections varying in accordance with their position along said conductor to vary the longitudinal velocity of waves in said conductor with respect to position along said conductor, the thickness of each of said projections transverse to said plane gradually changing from the core to the periphery of said projection, and a transducer coupled to one end of said core and adapted to induce substantial longitudinal compressive vibrations therein, said vibrations causing appreciable vibrations of said projections parallel to said dimension.

16. Fluid level measuring apparatus having, in combination, a sonic conductor having an elongated core with its longitudinal dimension having a substantial component normal to and normally breaking the fluid surface to be measured, and a plurality of fin-like projections secured to the core in spaced relation and having surfaces with appreciable areas of projection on a plane at right angles to said dimension, a dimension of said fin-like projections varying in accordance with their position along said conductor to vary the longitudinal velocity of waves in said conductor with respect to position along said conductor, and a transducer coupled to one end of said core and adapted to induce substantial longitudinal compressive vibrations therein, said vibrations causing appreciable vibrations of said projections parallel to said dimension, whereby to enhance reflection of such vibrations from said fluid surface.

17. Fluid level measuring apparatus having, in combination, a sonic conductor having an elongated core portion with its longitudinal dimension having a substantial component normal to and normally breaking the fluid surface to be measured and a plurality of fin-like projections secured to the core in circumferentially spaced relationship and extending outwardly therefrom in planes substantially parallel to the axis thereof, a dimension of said fin-like projections varying in accordance with their position along said conductor to vary the longitudinal velocity of waves in said conductor with respect to position along said conductor, the thickness of each of said projections transverse to said plane thereof gradually changing from the core to the periphery of said projection, and a transducer coupled to one end of said core and adapted to induce substantially transverse torsional vibrations therein, said vibrations causing appreciable vibrations of said projections generally normal to the surfaces thereof.

18. Fluid level measuring apparatus having, in combination, a sonic conductor having an elongated core portion with its longitudinal dimension having a substantial component normal to and normally breaking the fluid surface to be measured and a plurality of fin-like projections secured to the core in circumferentially spaced relationship and extending outwardly therefrom in planes substantially parallel to the axis thereof, a dimension of said fin-like projections varying in accordance with their position along said conductor to vary the longitudinal velocity of waves in said conductor with respect to position along said conductor, and a transducer coupled to one end of said core and adapted to induce substantially transverse torsional vibrations therein, said vibrations causing appreciable vibrations of said projections generally normal to the surfaces thereof, whereby to enhance reflection of such vibrations from said fluid surface.

References Cited in the file of this patent

UNITED STATES PATENTS

| 1,936,706 | Affel | Nov. 28, 1933 |
| 2,511,611 | Wheeler | June 13, 1950 |
| 2,713,263 | Turner | July 19, 1955 |